United States Patent [19]

Briggs et al.

[11] Patent Number: 5,508,864
[45] Date of Patent: Apr. 16, 1996

[54] FLEXURES WHICH REDUCE FRICTION IN AN ACTUATOR FOR A DATA STORAGE DEVICE

[75] Inventors: John C. Briggs; David E. Jones, both of Layton, Utah

[73] Assignee: Iomega Corporation, Roy, Utah

[21] Appl. No.: 324,580

[22] Filed: Oct. 18, 1994

[51] Int. Cl.$^6$ .............................. G11B 5/55; G11B 21/08
[52] U.S. Cl. .............................................................. 360/106
[58] Field of Search ...................................... 360/106, 105

[56] References Cited

U.S. PATENT DOCUMENTS

| 4,504,879 | 3/1985 | Toldi et al. | 360/105 |
| 4,663,677 | 5/1987 | Griffith et al. | 360/71 |
| 4,663,686 | 5/1987 | Freeman et al. | 360/128 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,823,219 | 4/1989 | Ueda et al. | 360/106 |
| 4,901,173 | 2/1990 | Jones et al. | 360/99 |
| 4,965,685 | 10/1990 | Thompson et al. | 360/97 |
| 5,027,241 | 6/1991 | Hatch et al. | 360/105 |
| 5,126,905 | 6/1992 | Nomura et al. | 360/105 |
| 5,130,874 | 7/1992 | Watrous | 360/106 |
| 5,148,340 | 9/1992 | Watrous | 360/106 |
| 5,237,477 | 8/1993 | Hodapp et al. | 360/128 |
| 5,267,227 | 11/1993 | Nanke | 369/77.1 |

FOREIGN PATENT DOCUMENTS

WO93/18507  9/1993  WIPO .

OTHER PUBLICATIONS

"An Introduction to the Insite 325 FLOPTICAL® Disk Drive" Jim Godwin, SPIE vol. 1078, Presented at SPIE Optical Data Storage Topical Meeting (1989).

Primary Examiner—John H. Wolff
Attorney, Agent, or Firm—Woodcock Washburn Kurtz Mackiewicz & Norris

[57] ABSTRACT

A linear actuator for carrying read/write heads into engagement with a recording medium includes a carriage and a subcarriage. Flexible springs mount the subcarriage to the carriage. A voice coil motor has a coil mounted on the subcarriage. Initial energization of the coil causes linear movement of the carriage flexing the springs to produce small incremental movement of the heads. Further energization of the coil causes movement of the subcarriage on the bushings to provide coarse adjustment of the actuator.

6 Claims, 3 Drawing Sheets

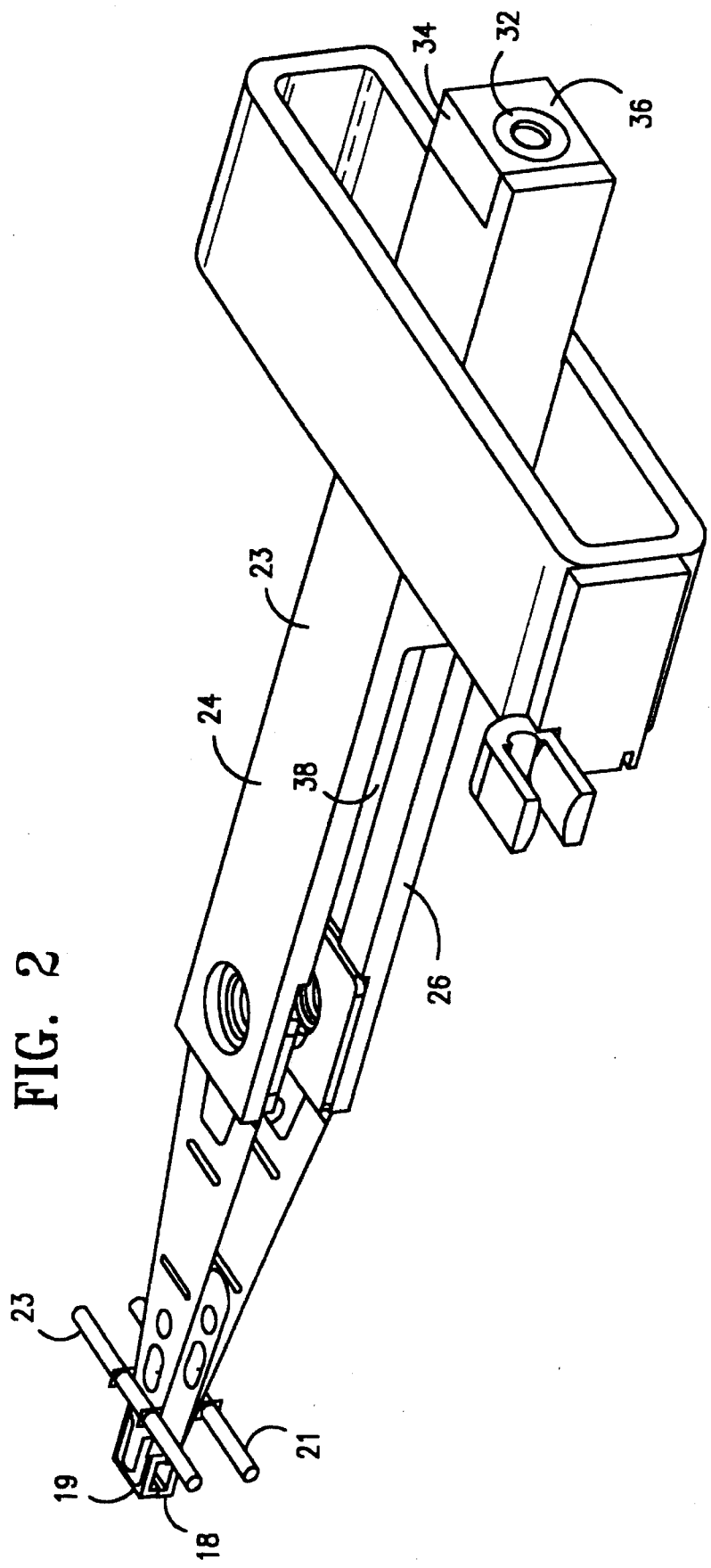

FLEXURES WHICH REDUCE FRICTION IN AN ACTUATOR FOR A DATA STORAGE DEVICE

RELATED APPLICATIONS

"Actuator For Data Storage Device, Jones, et al Ser. No. 08/324,599, (attorney's docket IOM-8908) filed concurrently herewith, is incorporated herein by reference.

BACKGROUND OF THE INVENTION

This invention relates to a linear actuator for carrying read/write heads into engagement with a recording medium and more particularly, to a linear actuator with flexures mounting a subcarriage to a carriage.

U.S. Pat. No. 4,740,851—Jones, et al and 4,663,677—Griffith, et al show removable media magnetic disk drives of the type made by the assignee of the present invention. A cartridge having a flexible recording medium is inserted into the disk drive. A motor rotates the disk which is engaged by magnetic read/write heads.

Rotary and linear actuators have been used to carry the magnetic heads into engagement with the disk. Precise positioning of the heads on a disk drive generally demands that external forces on the actuator be kept to a minimum. This typically prohibits the use of plain journal bearings (bushings) because of the frictional forces created during sliding.

Linear actuators have been used for magnetic disk drives, CD players, and optical recording drives. These actuators typically use a voice coil motor to move the carriage of the actuator. Existing products have dealt with the friction problem by using a costly two stage (two actuator) servo system.

It is an object of the present invention to allow both coarse and fine servo positioning to be achieved with one actuator.

SUMMARY OF THE INVENTION

In accordance with the present invention, a linear actuator has a carriage which is mounted by flexures to a subcarriage. A voice coil motor drives the carriage/subcarriage assembly linearly. Small, incremental movement is by the carriage flexing the flexures. Larger, coarse positioning of the carriage/subcarriage assembly is by movement on bushings along a linear track.

The foregoing and other objects, features and advantages of the invention will be better understood from the following more detailed description and appended claims.

SHORT DESCRIPTION OF THE DRAWINGS

FIG. 2 shows the actuator of the present invention;

DESCRIPTION OF THE PREFERRED EMBODIMENT

Figure 1A:
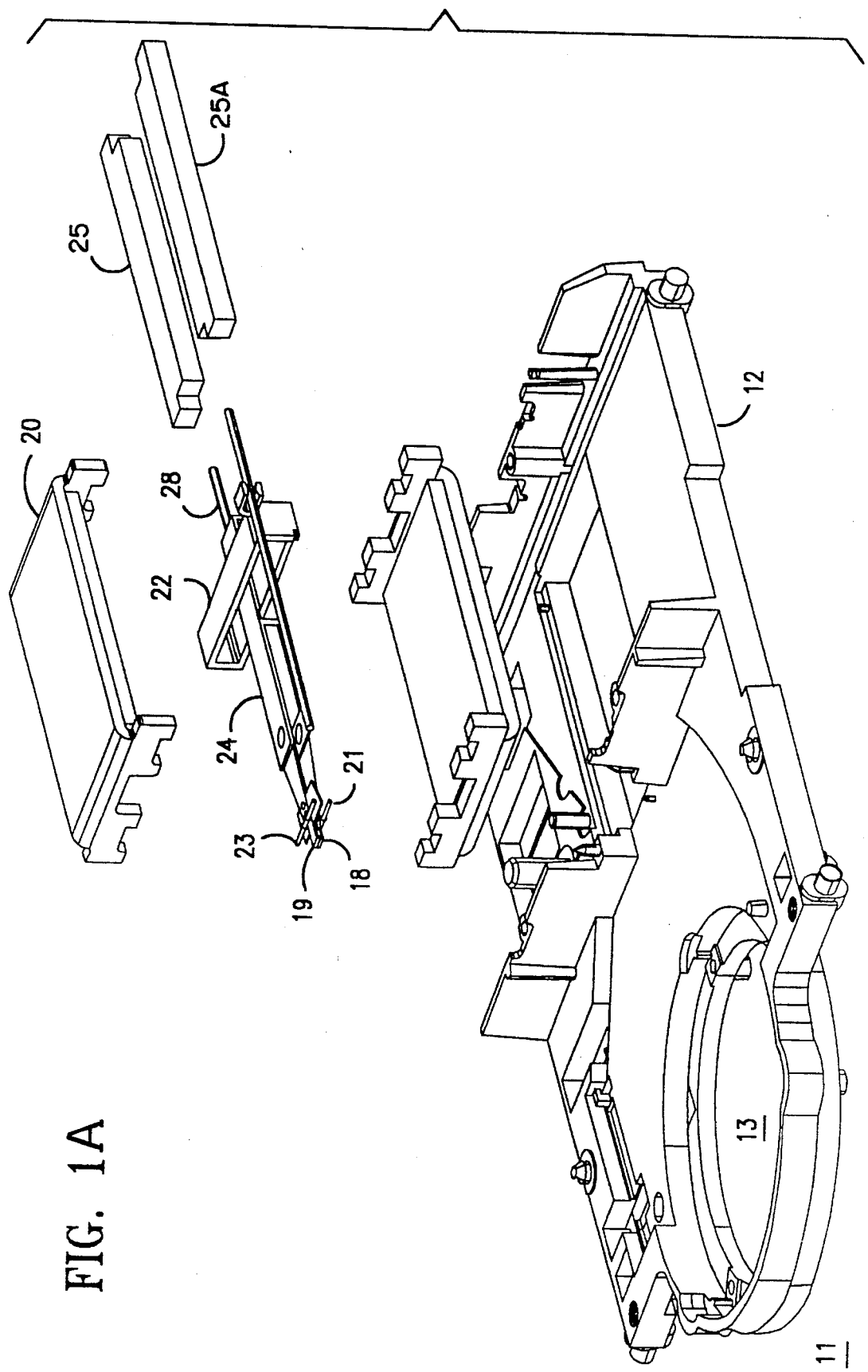
FIG. 1A shows the disk drive of the present invention with the cover removed.

FIG. 1 shows a disk drive of the type in which a cartridge 10 (FIG. 1A) contains a recording media 14. The cartridge is inserted into the drive at 11. A motor which is mounted on the platform 12 at 13 rotates the flexible disk in the cartridge.

The cartridge shown in FIG. 1A has a disk 14 with a hub 16 rotatably mounted therein to be rotated by the motor.

The disk is engaged by read/write heads 18 and 19 which are carried by the actuator of the present invention. Opposed heads 18 and 19 engage both sides of the disk. The heads 18 and 19 are mounted on standard Winchester hard disk drive suspensions which have been modified to include the lifting rods 21 and 23.

The voice coil motor for driving the carriage assembly into and out of engagement of the heads with the recording medium includes an outer return path 20, and inner return path members 25 and 25A. A two piece coil 22 is mounted on the carriage assembly. The coil is bonded to the subcarriage 34 (FIG. 4). When the coil 22 is energized, it interacts with the magnets to move the carriage/subcarriage linearly so that the heads 18 and 19 engage concentric tracks on the disk.

The carriage 27 includes two lightweight arms 24 and 26 on which the head suspensions are mounted. The carriage/subcarriage assembly travels on a central guide track 28 which is a cylindrical member, a small wire guide in the preferred embodiment.

The subcarriage 34 has cylindrical bushings 30 and 32 through which the cylindrical guide track 28 passes. The guide track 28 aligns the heads 18 and 19 with the disk and the motor. Bushings 30 and 32 are sapphire jewel bearings in the preferred embodiment.

In accordance with the present invention, the subcarriage 34 is mounted to the carriage 27 by flexible springs (flexure members) 36 and 38. The flexures are stainless steel and are positioned at opposite ends of subcarriage 34. The flexures are connected to the carriage 23 by the tabs 40 and 42.

The flexures 36 and 38 join the subcarriage 34 to the carriage 27 so that linear movement of the carriage 27, relative to the subcarriage 34 is accompanied by flexure of the flexure members 36 and 38. This occurs when the coil 22 is first energized. This produces small, incremental movement. Further energization of the coil causes gross movement of the carriage/subcarriage assembly on bushings 30 and 32.

While a particular embodiment of the invention has been shown and described, various modifications are within the true spirit and scope of the invention. The appended claims are, therefore, intended to cover all such modifications.

What is claimed is:

1. A linear actuator for carrying read/write heads into engagement with a recording medium comprising:

a carriage, said heads being mounted on said carriage;

a subcarriage;

flexible springs mounting said subcarriage to said carriage;

bearing means mounting said subcarriage for linear movement; and a magnetic motor for driving said carriage into and out of engagement of said heads with said medium so that initial linear movement is by said carriage flexing said springs and further, larger, linear movement is on said bearing means.

2. The actuator recited in claim 1 further comprising:

a central guide track, said bearing means including bushings mounting said subcarriage for linear movement along said guide track.

3. The disk drive recited in claim 2 wherein said track is a cylindrical member and said subcarriage has bushings through which cylindrical guide track passes.

4. The drive recited in claim 3 wherein said magnetic motor includes a coil mounted on said subcarriage.

5. The drive recited in claim 1 wherein said flexible springs include two rectangular flexure members positioned at opposite ends of said subcarriage and joining said subcarriage to said carriage so that linear movement of said carriage with respect to said subcarriage is accompanied by flexure of said flexure members.

6. The drive recited in claim 5 wherein said flexure members are rectangular stainless steel members which are thin enough to be flexible, one end of each flexure member being connected to said subcarriage and the other end being connected to said carriage.

* * * * *

UNITED STATES PATENT AND TRADEMARK OFFICE
CERTIFICATE OF CORRECTION

Figure 1B:
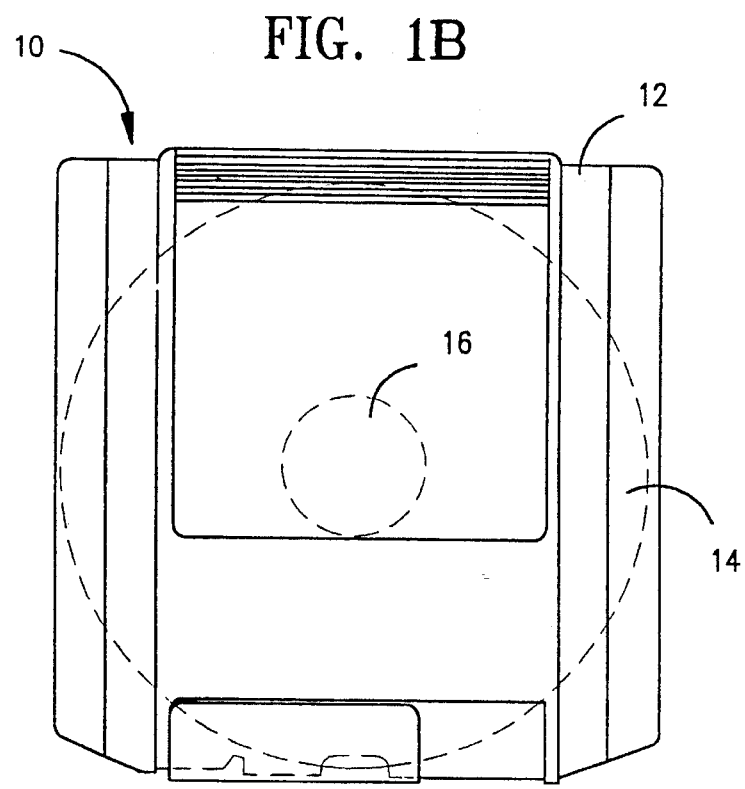
FIG. 1B shows a cartridge of the type used in such a disk drive.
Figure 3:
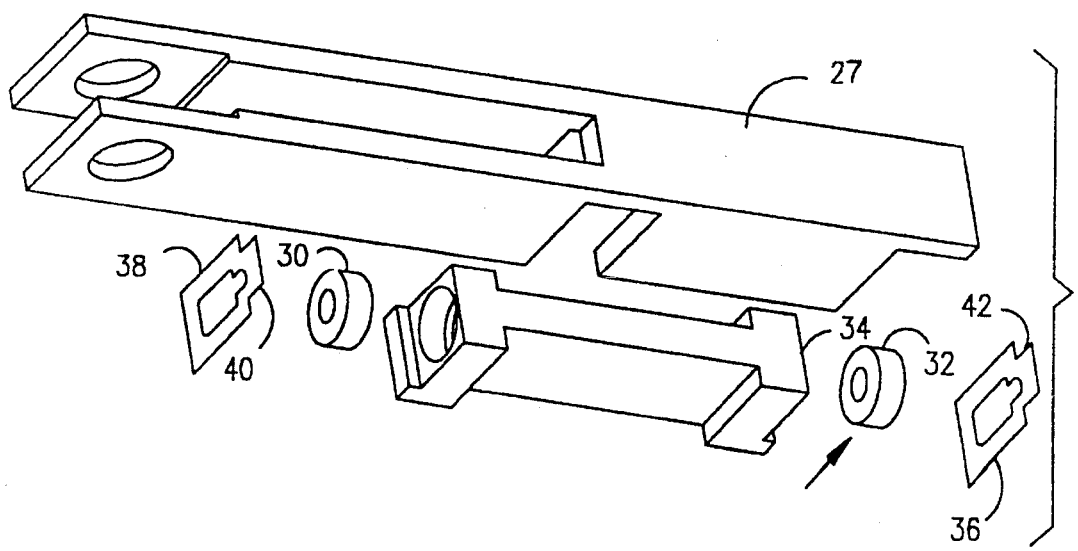
FIG. 3 is an exploded view of the carriage assembly.

PATENT NO.  : 5,508,864
DATED       : April 16, 1996
INVENTOR(S) : John C. Briggs and David E. Jones It is certified that error appears in the above-indentified patent and that said Letters Patent is hereby corrected as shown below:

Col. 1, line 64, "Fig. 1" should be --Fig. 1A--.
Col. 1, line 65, "Fig. 1A" should be --Fig. 1B--.
Col. 2, line 1, "Fig. 1A" should be --Fig. 1B--.
Col. 2, line 14, "(Fig. 4)" should be --Fig. 3--.

Signed and Sealed this

Twenty-sixth Day of August, 1997

Attest:

BRUCE LEHMAN

Attesting Officer

Commissioner of Patents and Trademarks